US005625533A

United States Patent [19]
Kim et al.

[11] Patent Number: 5,625,533
[45] Date of Patent: Apr. 29, 1997

[54] MONITOR CONTROL PANEL DRAWING APPARATUS

[75] Inventors: Young T. Kim; Jong T. Cha, both of Suwon, Rep. of Korea

[73] Assignee: Samsung Electronics Co., Ltd., Suwon, Rep. of Korea

[21] Appl. No.: 489,565

[22] Filed: Jun. 12, 1995

[30] Foreign Application Priority Data

Jun. 13, 1994 [KR] Rep. of Korea ............... 94-13614
Sep. 6, 1994 [KR] Rep. of Korea ............... 94-22878

[51] Int. Cl.⁶ ............... G06F 1/16; H05K 7/02; A47B 88/16
[52] U.S. Cl. ............... 361/681; 361/727; 312/333; 312/334.46; 312/319.1; 74/2; 74/422
[58] Field of Search ............... 220/4.02; 74/2; 312/333, 334.46, 319.1, 331, 7.2; 364/708.1; 131/231, 237, 242.5; 296/37.9, 37.11; 348/787, 789, 794, 836–843; 361/681–683, 725–727

[56] References Cited

U.S. PATENT DOCUMENTS

| 3,679,829 | 7/1972 | Hofmeister et al. ............ 361/682 X |
| 4,542,810 | 9/1985 | Shimbara ............ 74/422 X |
| 4,660,255 | 4/1987 | Dubarko ............ 312/333 |
| 4,660,881 | 4/1987 | Komeya et al. ............ 312/333 X |

*Primary Examiner*—Michael W. Phillips
*Attorney, Agent, or Firm*—Ladas & Parry

[57] ABSTRACT

In a monitor control box drawing apparatus, a control box pulled out by torsion spring elastic force from a housing mounted on the front case of a monitor. The control box is guided, when pulled out, by an arcuately shaped guide and protrusion, to travel downwardly along a predetermined path, so that convenient manipulation can be made, by a simple push of control switches, on the control box. A damper is provided between the control box and the housing to slow down the speed at which the control box travels from the housing. Also, an aesthetic visual appearance of the exterior of the monitor is provided.

18 Claims, 12 Drawing Sheets

MONITOR CONTROL PANEL DRAWING APPARATUS

BACKGROUND OF THE INVENTION

The present invention relates in general to a monitor control panel drawing apparatus, and more particularly, to a monitor control panel drawing apparatus for facilitating the opening and closing of a control panel of a monitor, and for enhancing the visual appearance of the monitor.

Generally, the control panel of a monitor is located and manipulated at the lower portion of the monitor's front case, which is backwardly located in comparison with the surface of a cathode ray tube, thereby rendering the manipulation of the control box panel unhandy.

An example of a prior art control panel apparatus is shown in the accompanying drawings, FIGS. 1 and 2, which illustrate a front cover 102 for protecting a control panel 100 that is pulled and opened forwardly for user manipulation of switches 101 provided on control panel 100 and is thereafter again pushed to be closed, which proves to be an inconvenience for manipulation.

Since the control box contains control switches for adjusting both the volume and the pictorial image on the display of a cathode ray tube, and, is virtually mounted on the perpendicular surface of the front case of the monitor, a manipulator of the control switches must excessively and inconveniently move toward the control box in order to identify proper location of control switches. Furthermore, the location of the control box on the front face of the monitor is unsightly.

SUMMARY OF THE INVENTION

It is therefore an object of the present invention to provide a monitor control panel drawings apparatus for housing the control panel in the front case of a monitor and for drawing the control panel out to be manipulated.

It is another object of the present invention to provide a monitor control panel drawing apparatus in which the control panel is arcuately drawn downward from a monitor so as to be more convenient in use.

It is still another object of the present invention to provide a monitor control panel drawing apparatus by which a control box is housed safely and pulled out according to a simple touch thereby contriving a manipulation of ease.

To achieve the above described objects and features, the monitor control panel drawing apparatus according to the present invention comprises, at the lower section of a front case of a monitor, a housing installed within the front case, to which a control panel is releasably engaged and capable of being pulled out elastically by a torsion spring at a reduced speed as driven by both pinion and rack gears. The control panel is guided by guide means as it is drawn from the housing and is further prevented from breaking away from the housing when fully drawn.

DETAILED DESCRIPTION OF THE PREFERRED EMBODIMENTS

Figure 1:
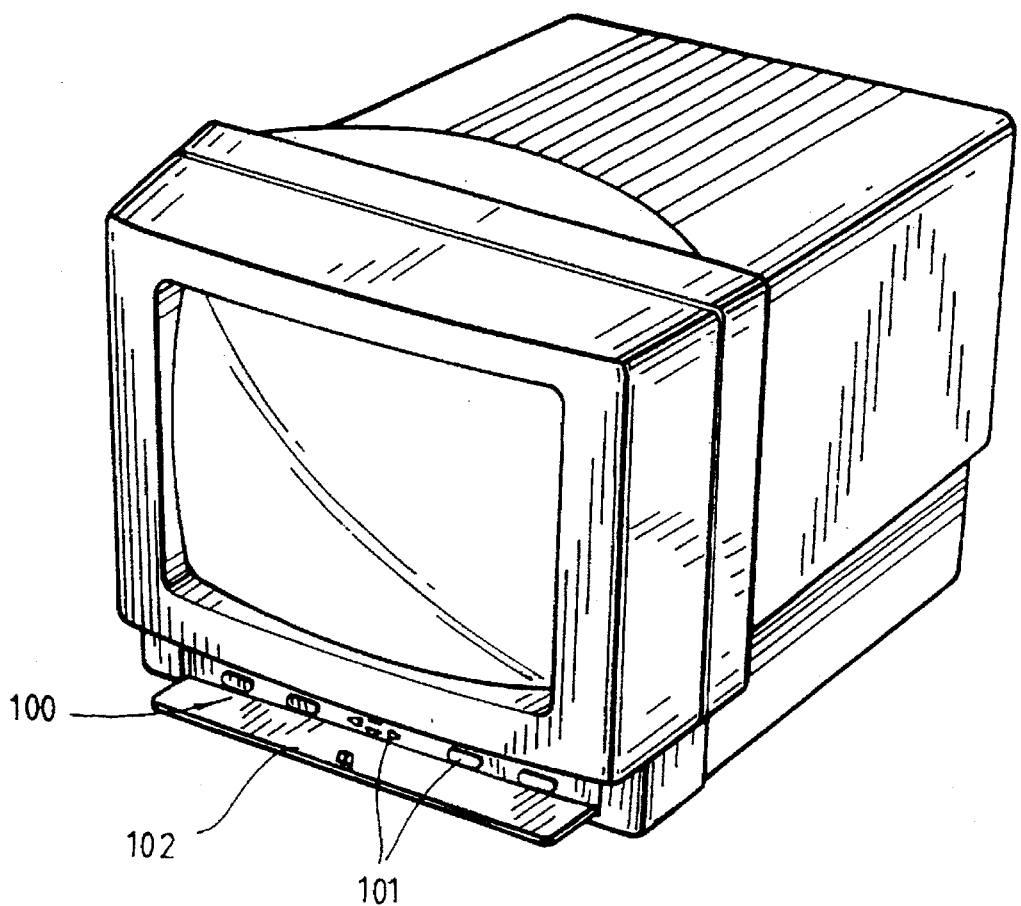
FIG. 1 is a perspective view of the monitor control section conventionally adapted to a monitor.
Figure 2:
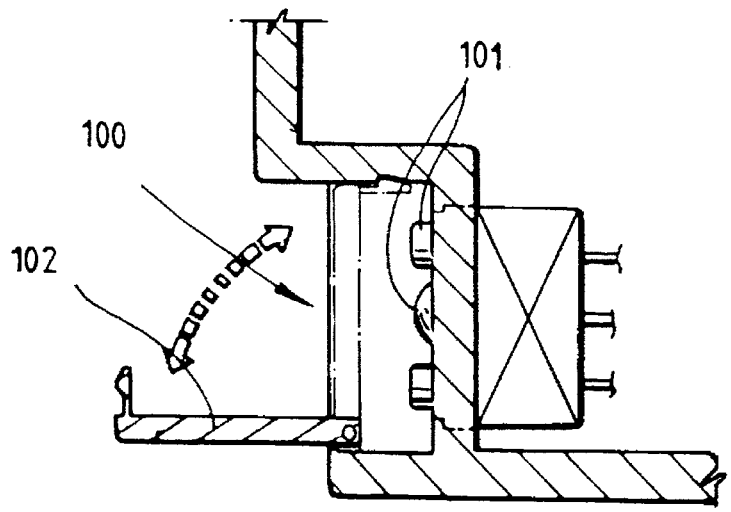
FIG. 2 is a cross-sectional view of the control section of FIG. 1.
Figure 3:
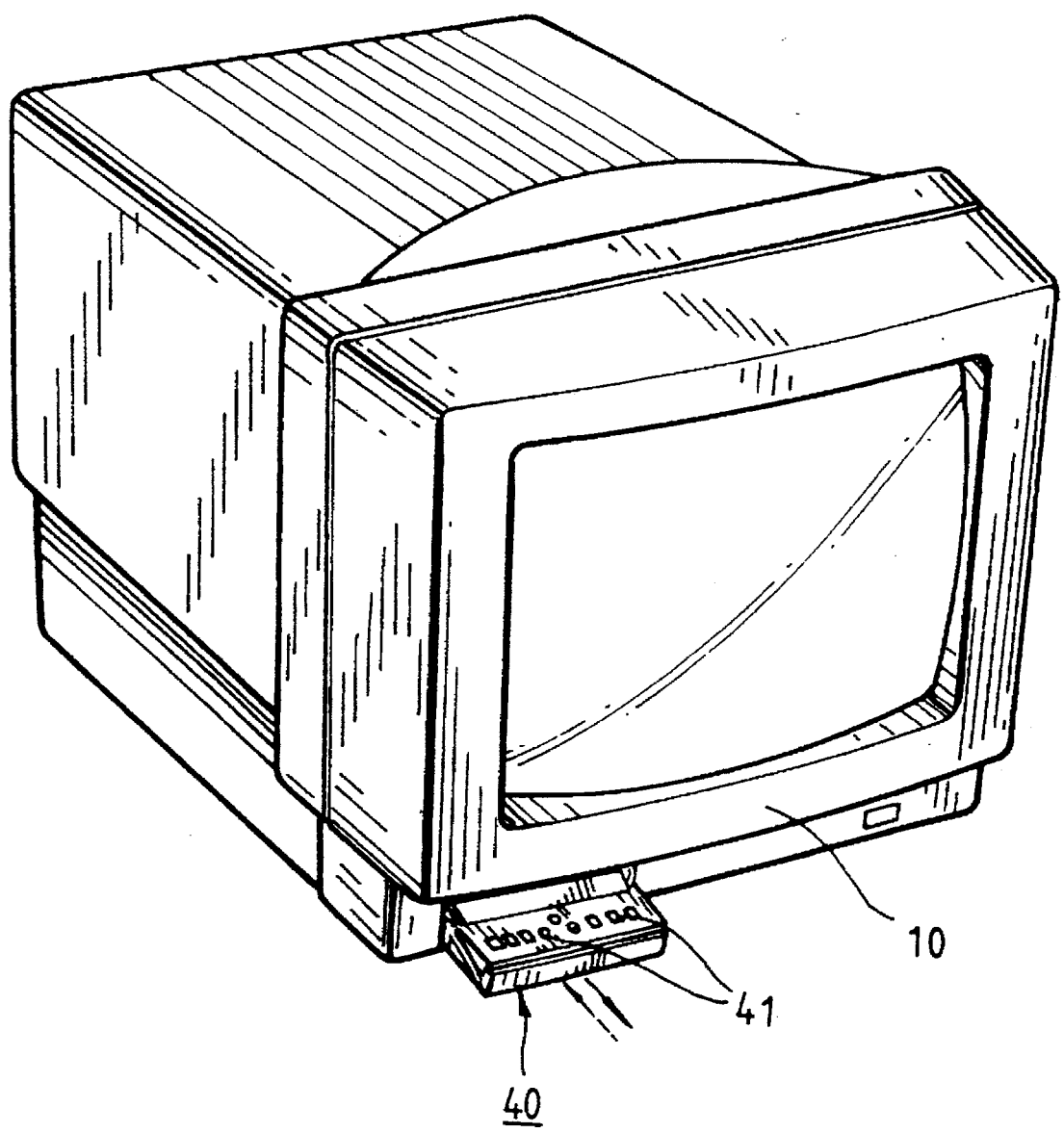
FIG. 3 is a perspective view of a monitor having the monitor control box according to the present invention.

FIGS. 4–10 illustrate a first preferred embodiment according to the present invention. The apparatus for securing and drawing out a control box 40 from a monitor generally comprises a housing 20 to be inserted and installed within an insertion hole 11 defined by walls adjacent a front case 10.

The housing 20 is provided with a guide assembly channel 21 located at each inner side for slidably engaging respective guide protrusions 12, horizontally formed on each inside wall of insertion hole 11. The housing 20 is also provided with a tension rib 22 of predetermined elasticity at both ends of the rear section. A coupling hole 23 is formed at both ends of said housing for coupling a front assembly end 13 of the front case 10. A stop 24 for engaging socket 14 that is formed on the upper inner wall of insertion hole 11, is formed on said housing 20 as shown in FIG. 10.

Figure 10:
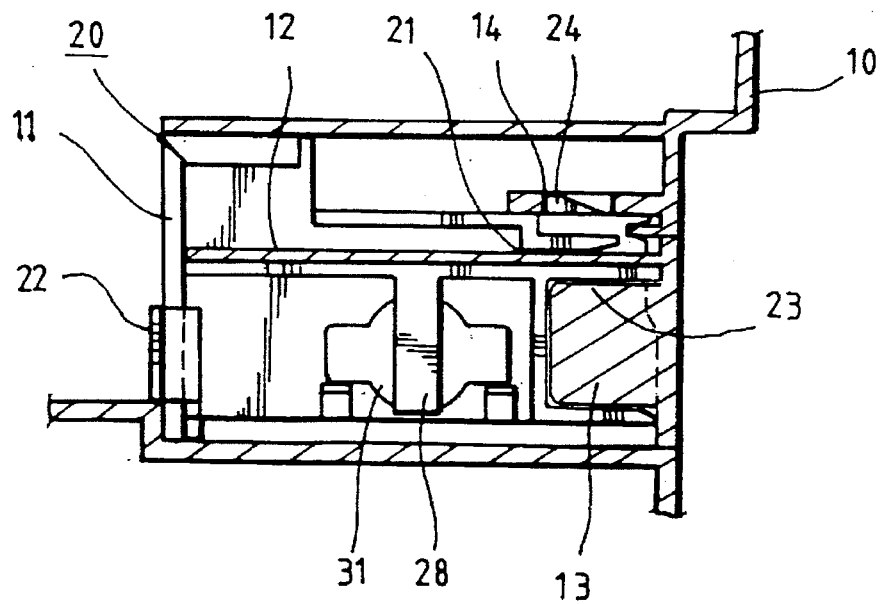
FIG. 10 is a side view of the invention-employed apparatus shown installed.

FIG. 10 illustrates, in detail, the housing 20 engageably inserted within insertion hole 11 of front case 10. The tension rib 22 of rear section of housing 20 engages rear walls of insertion hole 11, and, is assembled stably so as not to break away in front and rear directions by virtue of stop 24 fitted into socket 14. Furthermore, housing 20 will not move vertically by virtue of guide protrusions 12 that are slidingly inserted into guide assembly channels 21.

A push-pull switch 26 is fixedly installed in a mounting 25 of substantially rectangular shape and provided generally centered on the bottom side of housing 20. A torsion spring 27 is elastically interposed between spring shafts 27a also mounted on the bottom of housing 20. A damper support 28 is integrally constructed on one side of the housing 20 and is arranged to maintain a predetermined gap with a semicircular hole 29 formed on a side of housing 20, and, to serve as a means for preventing damper 31 that is press-fitted into hole 29, from deviating outwardly. Damper 31, having rotatable pinion gear 30 mounted thereon, has ends 31a that are supported and installed on supporter 32 so as not to deviate downwardly.

A guide member 33 of a substantially arcuate shape is formed on both inside walls of the housing 20 for slidable engagement with respective guide slots 44 of substantially arcuate shape that are formed in the side walls of control box 40.

Figure 4:
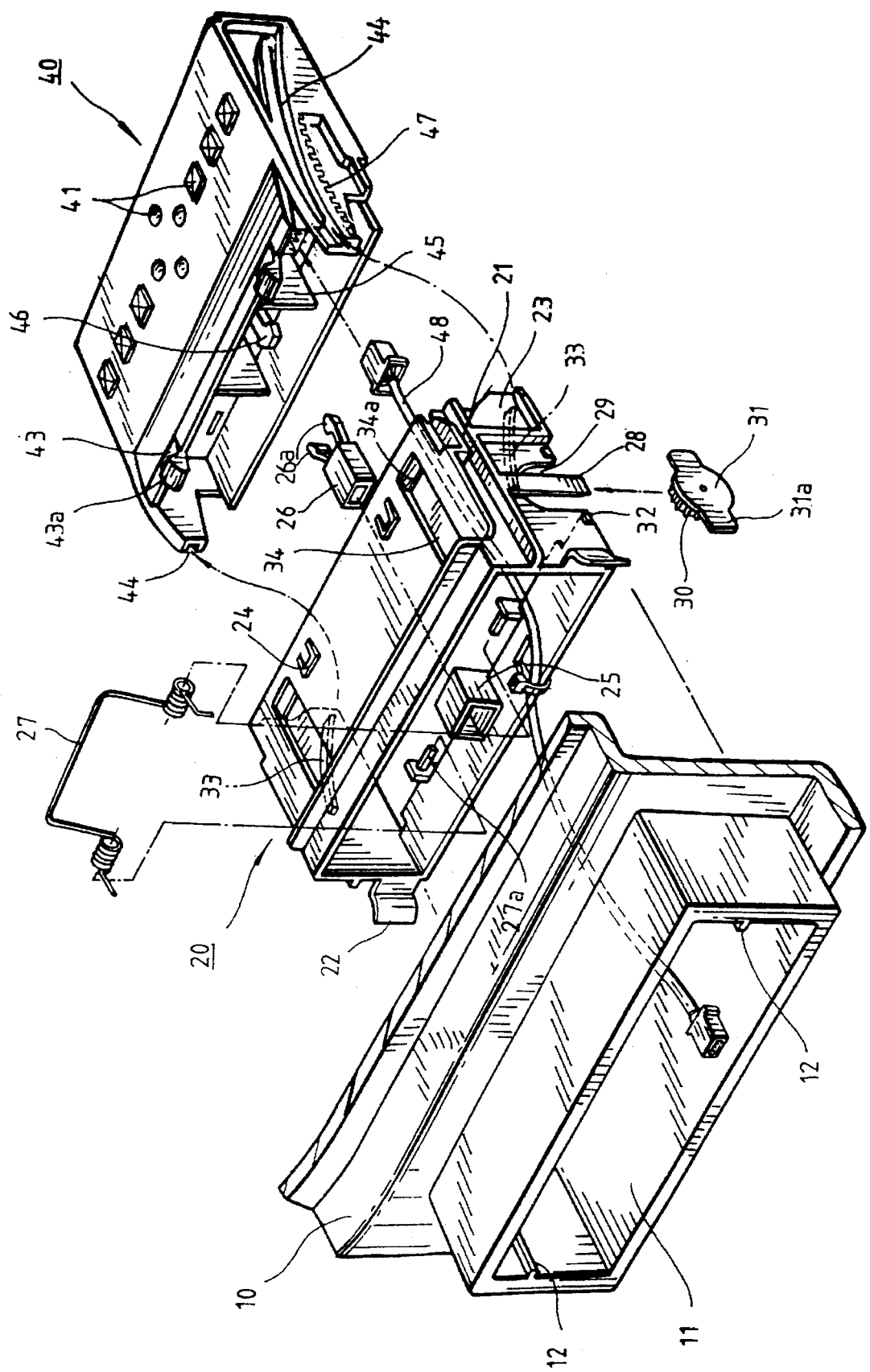
FIG. 4 is an exploded perspective view illustrating a first preferred embodiment according to the present invention.

Control box 40 is provided with a control switch 41 and contains a printed circuit board 42 therein. A flexible member 43 having tabs 43a is provided for guided movement along corresponding elongated breakaway preventing slots 34 formed on either side of the upper wall of housing 20. These tabs 43a become latched on respective slot end portions 34a near the front of housing 20. Below the flexible member 43 at the rear of control box 40 is formed a pair of spring ribs 45 for receiving the elastic force of torsion spring 27. Prong member 46 is also provided between ribs 45 for releasable engagement with push-pull switch 26 as shown in FIG. 4.

Below one side of guide slot 44 of control box 40 is formed rack 47 of substantially arcuate shape and the function of which will be explained in greater detail below. Printed circuit board 42 of control box 40 is coupled to main circuitry (not shown) by wire 48 to generate and receive signals.

Figure 5:
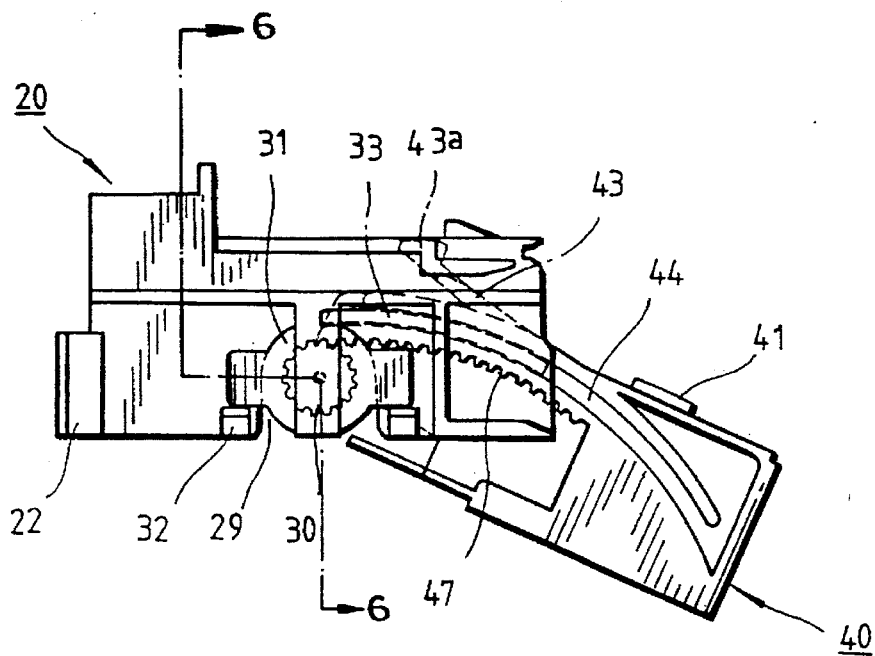
FIG. 5 is a side view of the first preferred embodiment in FIG. 4 shown assembled.
Figure 6:
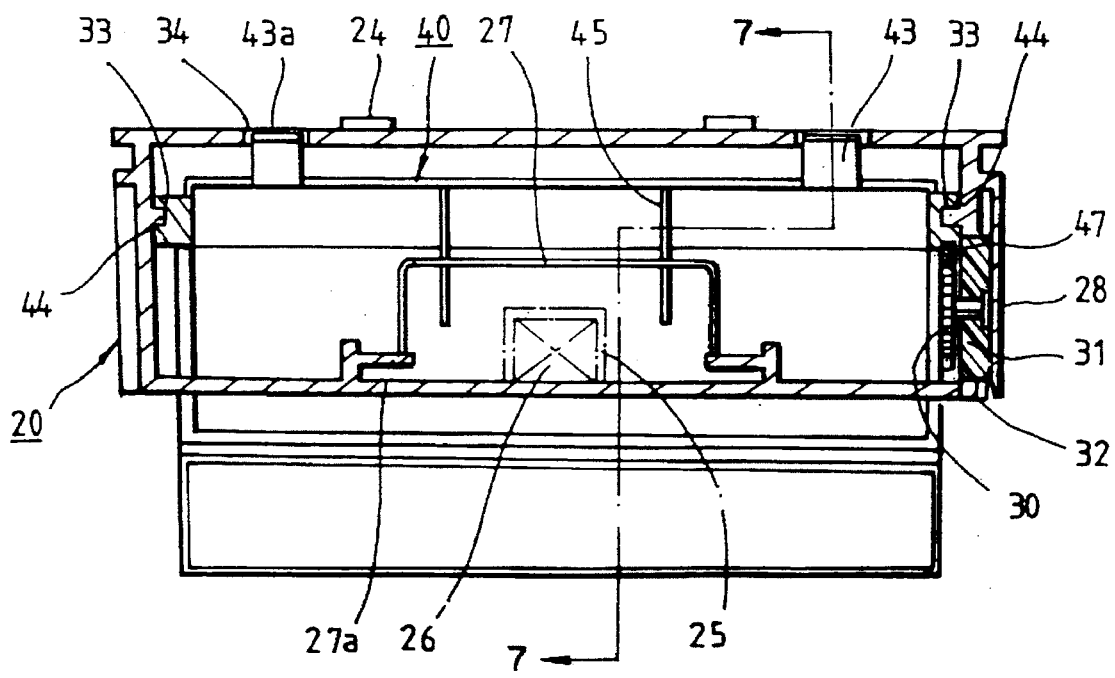
FIG. 6 is a cross-sectional view along the line 6–6' in FIG. 5.

The monitor control box drawing apparatus according to the present invention as described generally above is further explained with reference to FIGS. 5 and 6.

Control box 40, according to the present invention, is assembled within housing 20 so that guide protrusions 33 of housing 20 are inserted and installed within guide slots 44 of the control box 40. Flexible member 43 of control box 40 is assembled in such a manner so that tabs 43a are inserted into corresponding elongated breakaway preventing slots 34. Further to the assembling process, pinion gear 30 and rack 47 are engageably geared to each other, and, torsion spring 27 becomes biased against ribs 45 to hold a spring force capable of elastically pushing control box 40 in a direction outward from housing 20.

Both drawing and housing operation of control box 40 will be herein after explained in detail referring to FIGS. 7 and 8.

Figure 7:
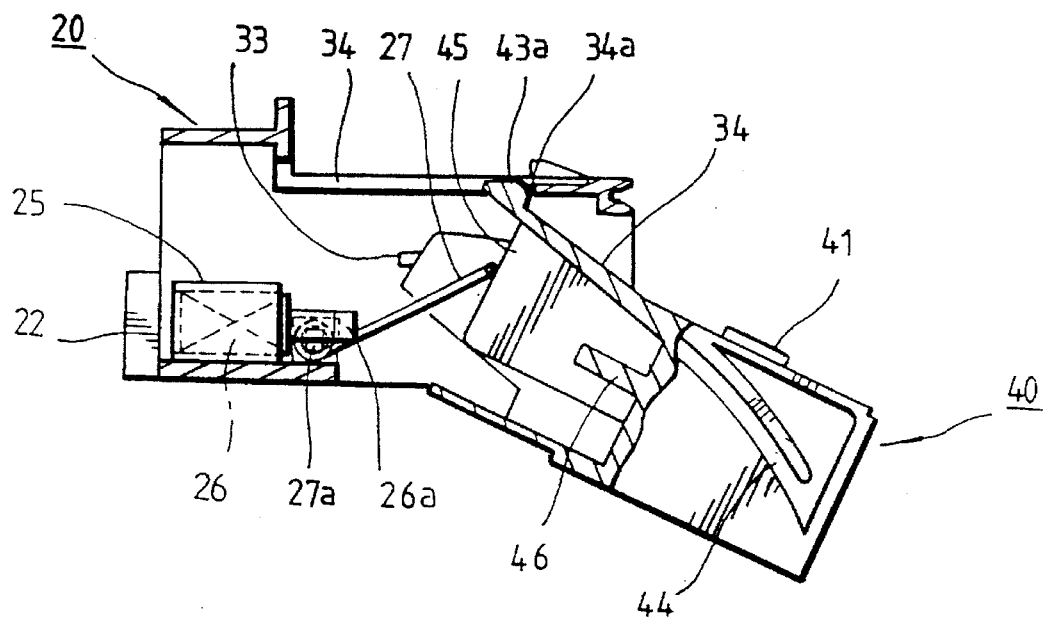
FIG. 7 is a cross-sectional view along the line 7–7' in FIG. 6.

FIG. 7 illustrates control box 40 in its fully drawn position after being pushed outward by the spring force contained in torsion spring 27. In this drawn out position, tabs 43a are caught on the corresponding slot end portions 34a of elongated breakaway preventing slots 34 to prevent separation of the control box 40 from housing 20.

Figure 8:
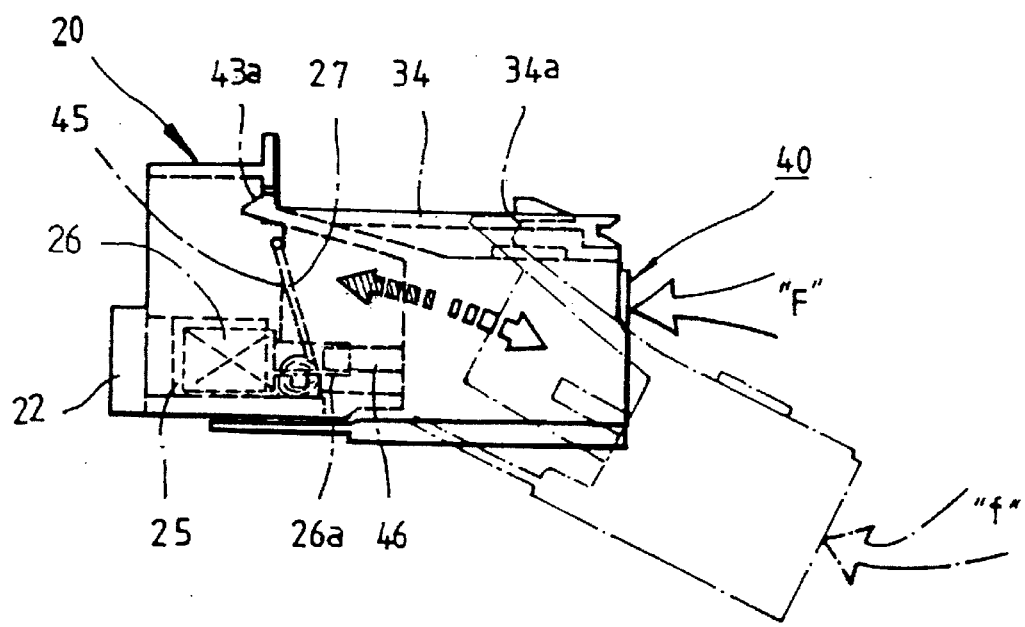
FIGS. 8 and 9 are side views illustrating varied position of the first preferred embodiment according to the present invention, respectively.

Accordingly, when control box 40 is not in use and is to be again housed in housing 20, only finger force "f" is needed to be applied on control box 40, as shown in FIG. 8, to push control box 40 back into housing 20. By doing this, prong member 46 of control box 40 is engaged with push-pull switch 26 to thereby secure control box 40 within housing 20. During this operation, tabs 43a of flexible member 43 are guided backward along breakaway preventing slots 34 and, simultaneously, torsion spring 27 is biased back into engagement with spring rib 45 to thereby hold increased elastic force. In addition, to release control box 40 from housing 20, an external pressure force "f" is applied on control box 40 to move prong member 46 slightly in a backward direction to thereby snap release the prong 46 from the grip of push-pull switch 26. Specifically, the push-pull switch 26 snaps into engagement with prong member 46 when catches 26a of switch 26 are backwardly moved once an external force is applied to said box. A releasing operation is performed wherein catches 26a are opened when an external force is again applied to control box 40 to move the prong 46 backward slightly when the box is in the secured state, as described above. The structural scheme of such a push-pull switch is a notorious that detailed description therefor and drawings thereof are omitted. As a result, once prong member 46 is set to be free by releasing operation of push-pull switch as described above, then control box 40 is pulled out to the outside by elastic force of torsion spring 27.

Figure 9:
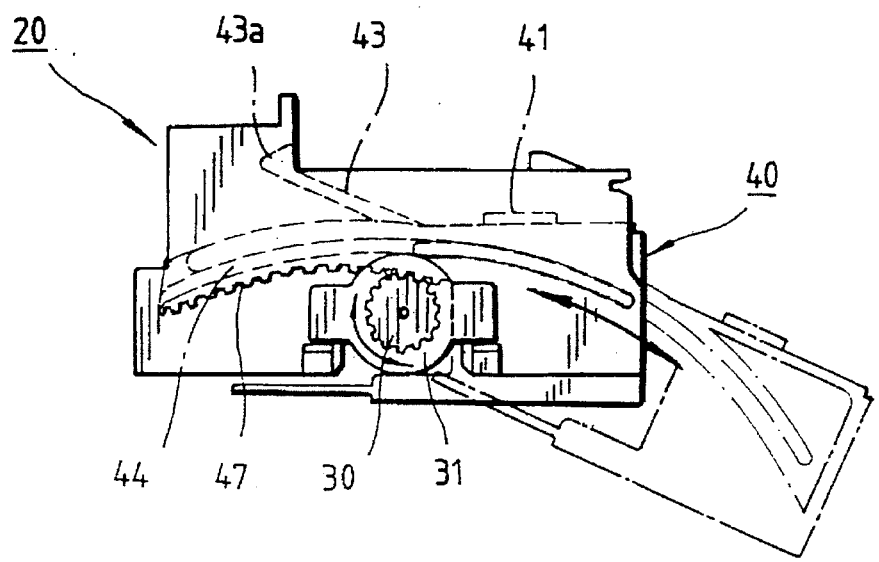

Now, referring to FIG. 9, the drawing operation proceeding at reduced speed of control box 40 is hereinafter explained in greater detail.

The drawing operation is first initiated by releasing the prong 46 by push-pull switch 26 following application of pressure to control box 40 during drawing out operation. Once the prong member 46 is released from push-pull switch, then control box 40 is immediately pulled out by the spring force of torsion spring 27 and guided to the outside by guide members 33 of housing 20 within guide slots 44 of control box 40. At the same time, because both of the guide slots 44 and guide members 33 are arcuately shaped and incline in a downward direction, control box 40 is pulled out in such a manner that front end of control box slopes downward from housing 20. Consequently, a user of a monitor may well manipulate control switch 41 more easily since control box 40 is pulled out at a predetermined incline and sloping in a forward direction.

As rack 47 moves back and forth following housing and drawing out operation of control box 40 with pinion gear engaged rotatably therewith, then the elastic force or torsion spring 27 is partially offset by both of the movement and rotation, and simultaneously the above drawing operation slows down. Thus, a more stabilized pulling operation of control box 40 is assured.

Figure 11:
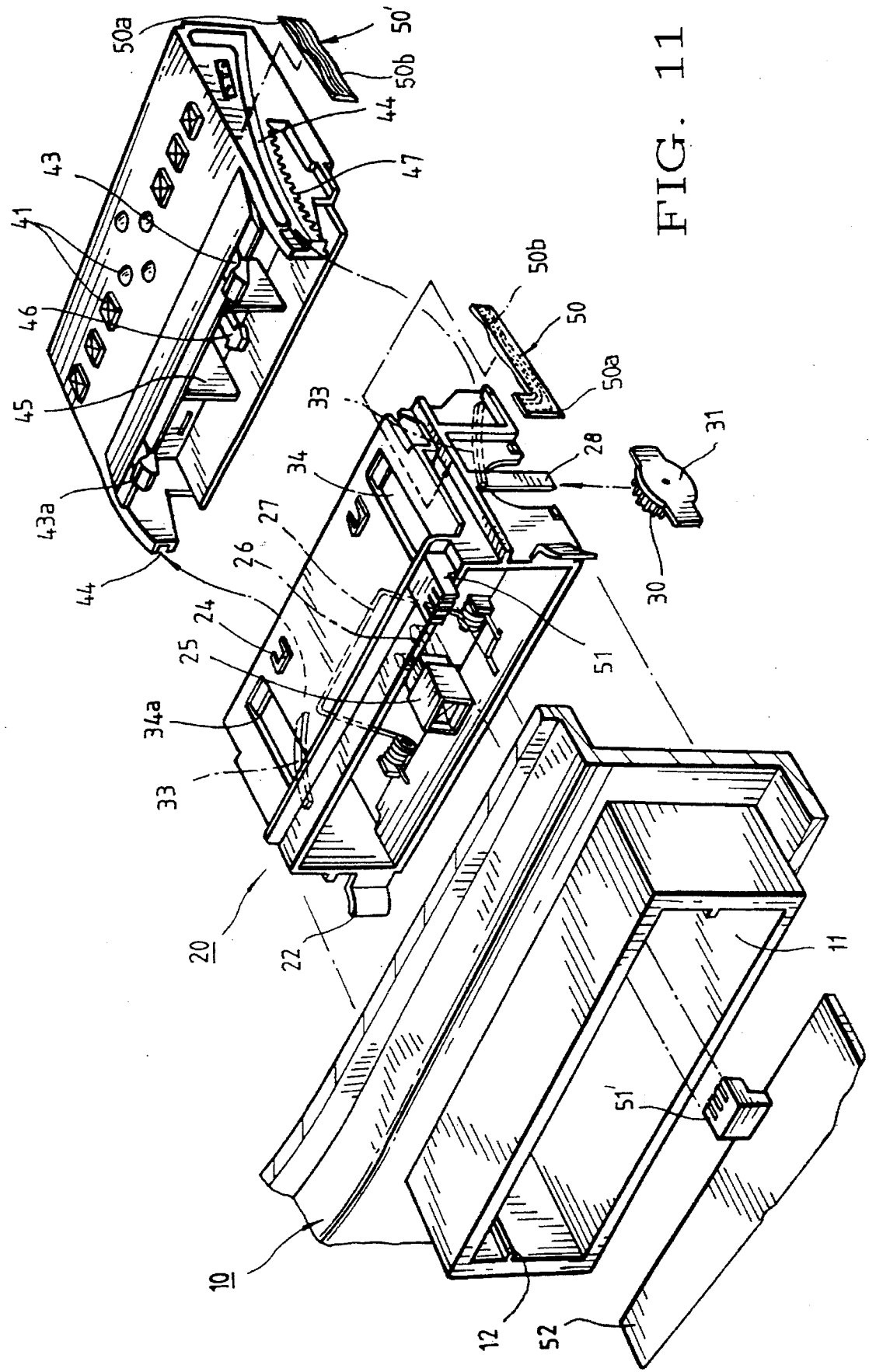
FIG. 11 is an exploded perspective view illustrating the second preferred embodiment according to the present invention.
Figure 12:
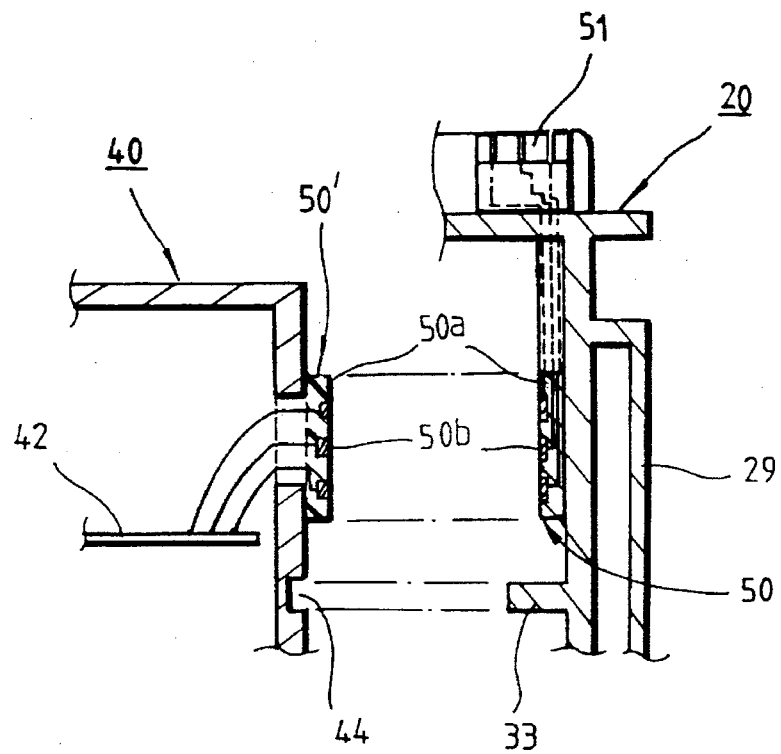
FIGS. 12 and 13 are an enlarged exploded sectional view and side view of the second preferred embodiment according to the present invention, respectively.
Figure 13:
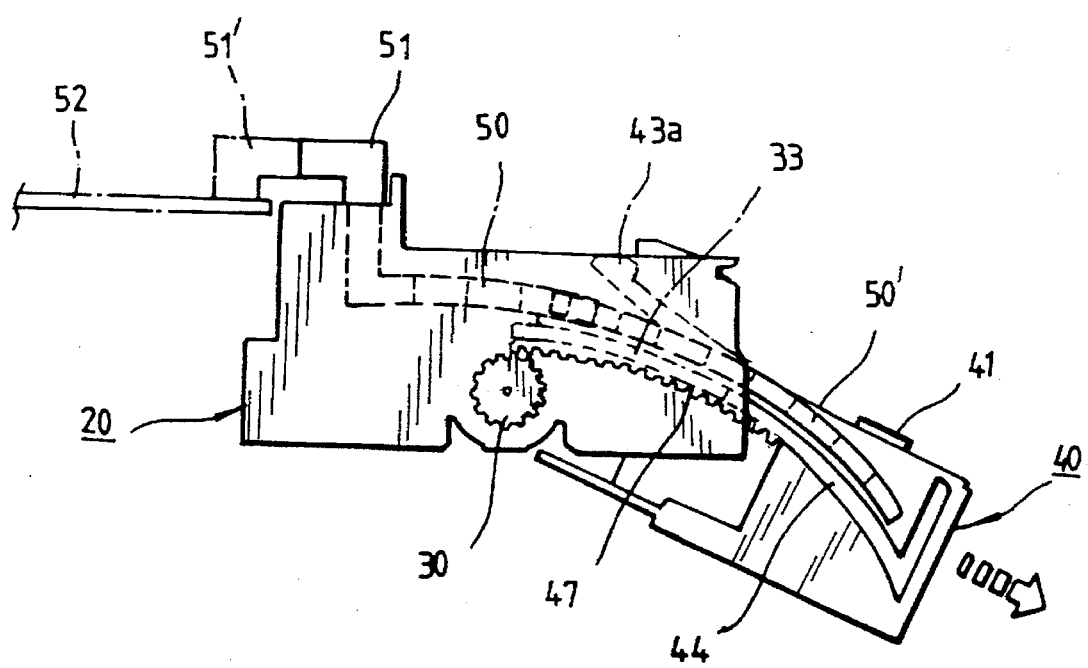
Figure 14:
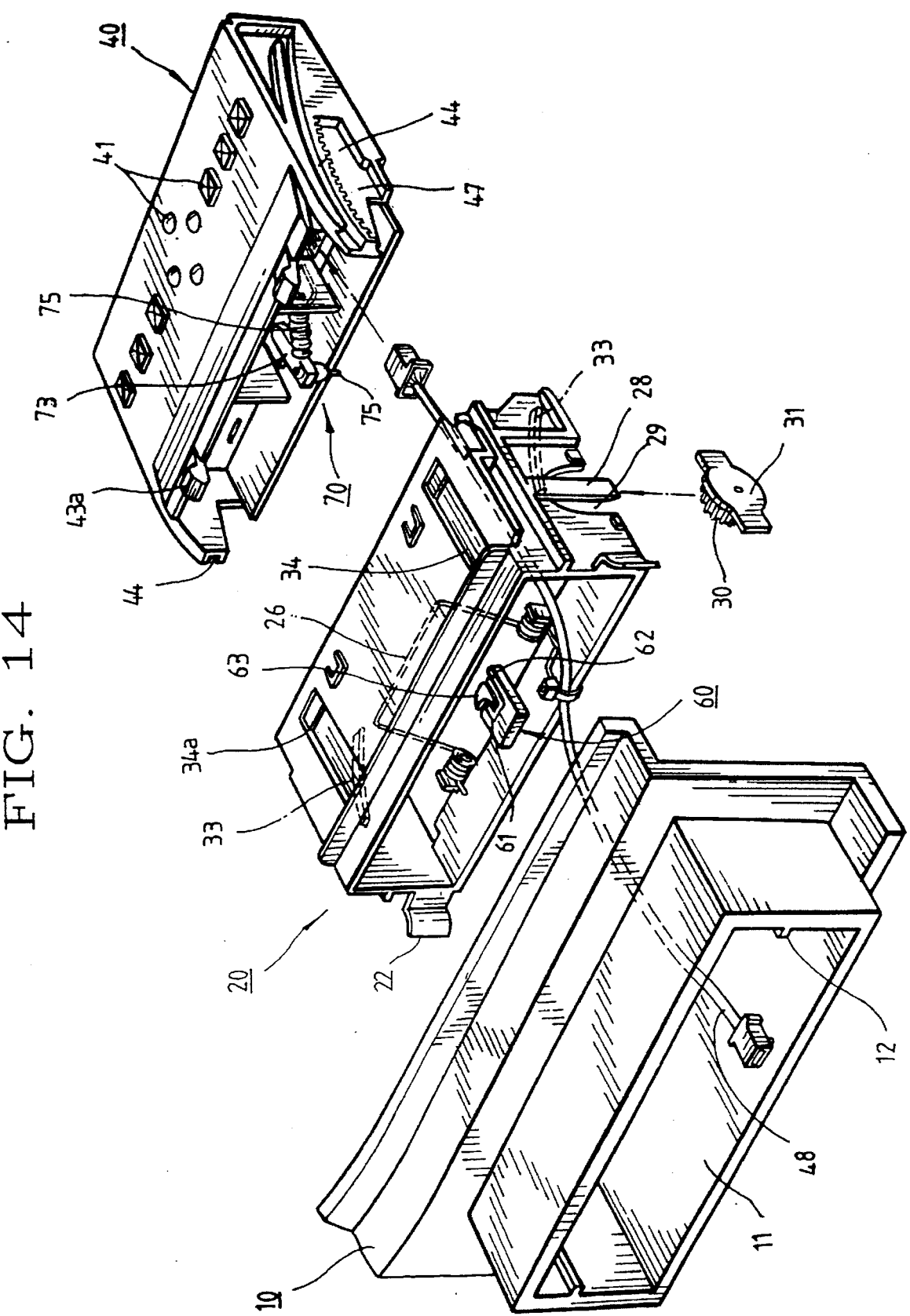
FIG. 14 is an exploded perspective view illustrating the third preferred embodiment according to the present invention.

FIGS. 11–13 illustrate the second preferred embodiment of signal transmitting means for control section disclosed in the control box drawing apparatus whereby electrical signals generated from circuitry on printed circuit board 42 of control box 40 are transmitted to main circuit portion 52 via signal frames 50 and 50' and connectors 51 and 51'.

For example, should an electrical signal transmission be transmitted only via cable 48, then a possible interference on the operation of circuitry involved may occur during housing and/or drawing operation since the cable 48 is located inside housing 20 and may be jammed between housing and control box. Additionally, broken cable or any other possible problems may occur in an extreme case.

In the second preferred embodiment, an advanced electrical signal transmission means for the control portion consists of electric signal frames 50 and 50' that are provided with a resin frame 50a having a plurality of individual copper wires 50b integrally formed therein with bends formed on each contact side thereof. The electrical signal frames 50 and 50' are adhesively disposed on inside wall of housing 20 and outside control box 40, respectively, and one signal frame 50 is connected to connecter 51 mounted on housing 20 while the other signal frame 50' disposed on control box 40 is connected to an inner circuitry. The signal frame 50 adhesively disposed on inner side of housing 20 and the other signal frame 50' on outer side of control box 40 overlap and engage each other, and, are moved in a manner such that, during drawing operation of the control box 40, both ends of signal frames 50 and 50' contact each other so that a signal generated from control box 40 is applied to main circuitry 52 via signal frames 50 and 50' and connectors 51 and 51'.

FIGS. 14–20 illustrate the third preferred embodiment showing a binding and releasing device for housing and fixing control box 40 inside housing 20, and, for enabling release of control box 40 for pulling out control box 40, according to the present invention.

Figure 15:
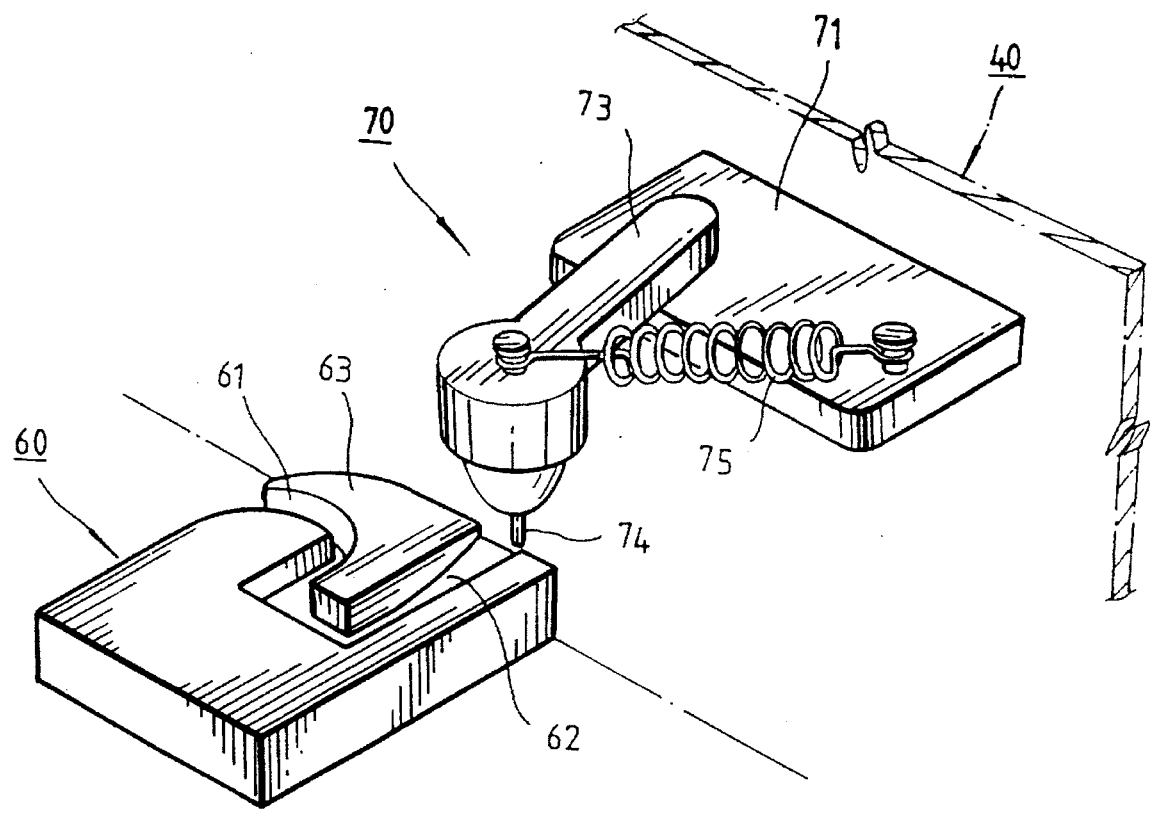
FIG. 15 is a perspective view illustrating the essential portion of the third preferred embodiment according to the present invention.
Figure 16:
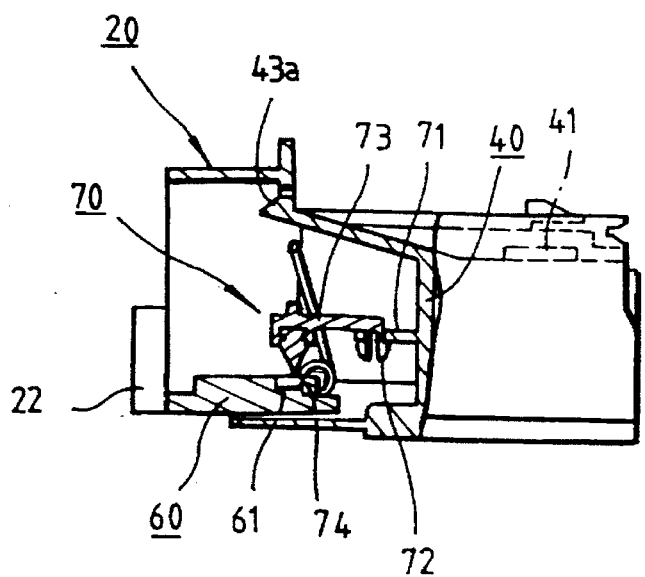
FIG. 16 is a side view partially illustrating the essential portion of the third preferred embodiment according to the present invention.
Figure 17:
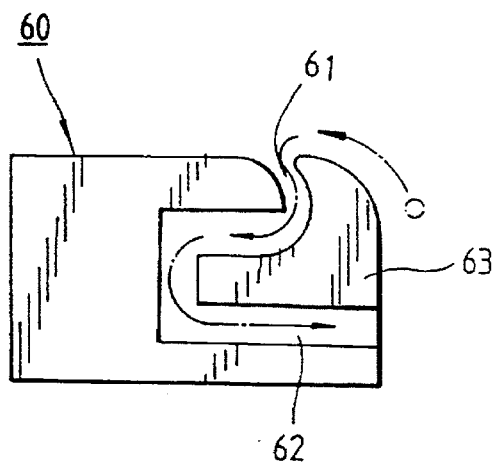
FIG. 17 is a plain view illustrating the latch section of the third preferred embodiment according to the present invention, and FIGS. 18A–18B, 19A–19B and 20A–20B each show the side view and plan view for varied positions of the essential section of the preferred embodiments according to the present invention, respectively.

Instead of push-pull switch 26, latch portion 60 comprising moving home 61, slope home 62 and guide protrusion 63 of hook shape, and a supporting plate 71 is provided on a side wall of control box 40 on which a lever 73 with integrally formed stopper 72 is loosely press-fitted to allow the lever to move in all directions within latch portion 60. At an end of the lever 73 is provided guide pin 74 that, when engaging latch 60, moves along slope 62 and moving home 61 of the latch portion 60. As shown in FIG. 15, guide portion 70 is connected with coil spring 75 at one end, which is fixed firmly to the supporting plate 71 at the opposite end.

A greater detailed explanation will hereinafter be given to the above binding and releasing devices of control box according to the present invention referring to FIGS. 18–20.

Figure 18A:
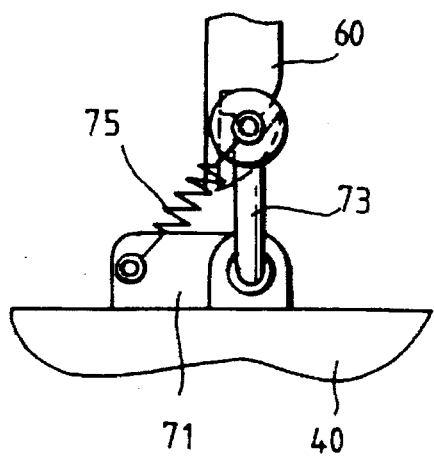
Figure 18B:
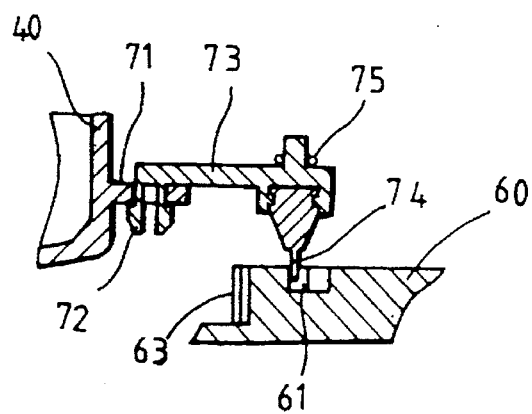
Figure 19A:
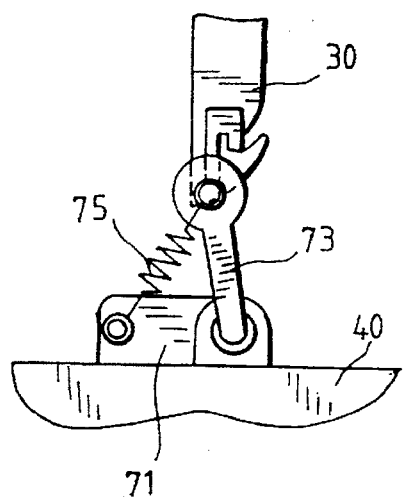
Figure 19B:
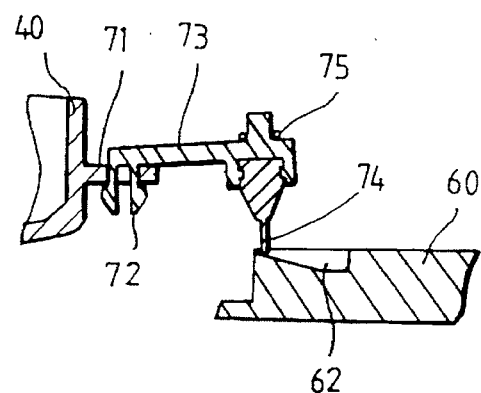

During drawing operation of control box, as shown in FIG. 18 (A) and (B), guide pin 74 of guide portion 70 is first located on moving home 61 of latch portion 60, and then, as shown in FIGS. 19A and 19B, upon application of pressure to control box 40, the guide pin on lever 73 moves from home 61 toward slope home 62 to exit out of latch portion 60 along the slope home 62.

On this occasion, guide pin 74 is moved from moving home 61 to slope home 62 by tension force supplied by coil spring 75 that pulls guide pin 74 in the left direction. Coil spring 75 has ends that are respectively connected to support plate 71 and guide pin 74 of lever 73. Lever 73, whose stopper 72 is press-fitted to the hole of the support plate, is moved upwardly around at slope home 62.

Figure 20A:
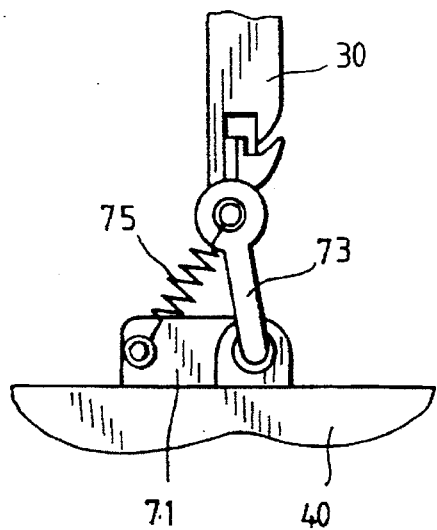
Figure 20B:
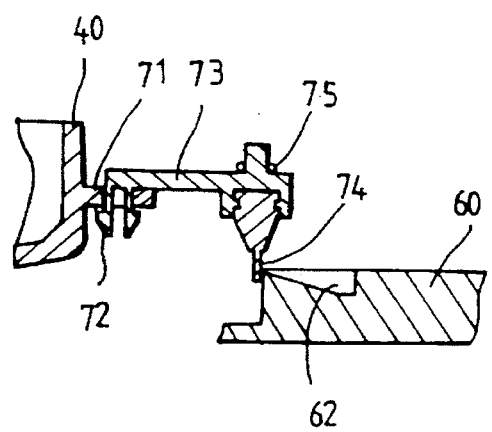

When control box 40 is pressed to be housed, as shown in FIGS. 20A and 20B, guide pin 74 moves forth along guide protrusion 63 of latch portion 60 in such a manner that lever 73 of support plate 71 moves downward. Then, guide pin 74, when advanced into moving home 61 of the latch portion, triggers the tension force of coil spring 75 to thereby house and secure control box 40 in housing 20.

According to the present invention as described above, by using monitor control box drawn tiltedly with an incline of certain degree, the convenience of manipulation of monitor control box, and, the visual appearance of the exterior of a monitor, are enhanced.

What is claimed is:

1. A monitor control box drawing apparatus having a control box at the front case of a monitor, said monitor having main circuitry for effecting user generated commands from a control portion of said control box, said apparatus comprising:

a housing for said control box, said housing being secured to the monitor and including means for releasably securing said control box within said housing whereby to permit release of said control box from said housing upon application of a force;

drawing means for pulling out said control box from said housing in an exiting direction, said drawing means engaging said control box in a manner such that said control box is pulled out upon release from said housing;

means for preventing separation of said control box from said housing as said control box exits said housing by said drawing means;

guide means for guiding said control box in a downward direction as said control box is drawn in said exiting direction, said guide means including a guide protrusion provided on said housing and inserted in a complementary guide slot provided on said control box; and electrical signal transmission means for transmitting a signal generated from said control portion of said control box to said main circuitry located within said monitor.

2. The drawing apparatus as claimed in claim 1, wherein said drawing means comprises a torsion spring, being installed inside said housing, and having an elastic force for pulling said control box outside said housing.

3. The drawing apparatus as claimed in claim 1, wherein said means for releasably securing said control box within said housing comprises a push-pull switch installed inside said housing and engageable with a prong member located on said control box for securing said control box to said housing and, wherein said control box receives an applied force for enabling said push-pull switch to disengage said prong member and release said control box from said housing.

4. The drawing apparatus as claimed in claim 1, wherein said separation preventing means comprises one or more flexible tab members extending from said control box and capable of slidable engagement with corresponding elongated breakaway prevention slots formed on an upper portion of said housing, said flexible tab members sliding within said elongated breakaway prevention slots as said control box is drawn out of said housing.

5. The drawing apparatus as claimed in claim 4, wherein each said breakaway prevention slot is formed lengthwise so that said one or more of said flexible tab members may travel along said slot.

6. The drawing apparatus as claimed in claim 1, wherein said guide means includes a guide protrusion formed on both inner sides of said housing for slidable engagement with said complementary guide slots formed on outer sides of said control box.

7. The drawing apparatus as claimed in claim 6, wherein each said guide protrusion and complementary guide slot is of an arcuate shape so that said control box is pulled downward at a predetermined incline.

8. The drawing apparatus as claimed in claim 1, further comprising drawing speed reducing means for drawing said control box at a reduced speed, said drawing speed reducing means comprising a pinion gear installed on one side of said housing and a rack gear formed on one side of said control box, whereby said pinion gear and rack are engageably meshed with each other.

9. The drawing apparatus as claimed in claim 8, wherein said rotatable pinion gear is disposed on a damper of said housing and supported by a damper supporter.

10. The drawing apparatus as claimed in claim 9, wherein said damper having said pinion gear is inserted into a semicircular hole formed on one side of said housing.

11. The drawing apparatus as claimed in claim 1, wherein said electrical signal transmitting means comprises contactable signal frames adhesively disposed at the inner side of said housing and the outer side of said control box, respectively, said signal frames contacting each other for transmitting electrical signals generated from said control portion when said control box is drawn from said assembly.

12. The drawing apparatus as claimed in claim 11, wherein one signal frame is electrically connected to a connector mounted on said housing.

13. The drawing apparatus as claimed in claim 1, wherein said means for releasably securing said control box within said housing comprises a latch portion located on said housing and having a guide protrusion member, and, a lever means pivotably mounted on said control box, said lever means including a guide pin and, a coil spring means for tensioning said lever means, wherein when said control box is secured to said housing, said guide pin is adjacent said guide protrusion member at a home position with said coil spring means in tension, and, upon releasing activation of said control box, said guide pin is guided along said guide protrusion by action of said coil spring means to release said control box from said housing.

14. A monitor control box drawing apparatus having a control box at the lower section of the front case of a monitor, said monitor having a main circuitry for receiving user generated commands from said control box, said apparatus comprising:

drawing means elastically acting on the control box, said control box being inserted inside a housing installed in the lower section of the front case of the monitor, said drawing means acting on said control box to urge the control box outwardly from the housing;

releasable holding means for raleasably holding said control box in said housing in opposition to said drawing means;

separation means for preventing separation of said control box from said housing when the control box is urged outwardly from the housing;

guide means for guiding said control box for travel in an arcuately downwards direction when the control box is urged outwardly from the housing, said guide means including a guide protrusion on said housing inserted in a guide provided on said control box;

drawing speed reducing means acting on said control box in opposition to said drawing means for causing said control box to travel outwardly from the housing at a reduced speed; and electrical signal transmission means for transmitting a signal generated from said control box to paid main circuitry in the monitor.

15. The drawing apparatus as claimed in claim 14, wherein said drawing means comprises a torsion spring.

16. The drawing apparatus as claimed in claim 14, wherein said releasable holding means comprises a prong member on said control box and a push-pull switch on said housing releasably engaging said prong member.

17. The drawing apparatus as claimed in claim 14, wherein said drawing speed reducing means comprises a pinion gear installed on one side of said housing and a rack gear formed on one side of said control box in meshing engagement with said pinion gear.

18. The drawing apparatus as claimed in claim 17, wherein said drawing speed reducing means further comprises a damper engaging said pinion gear and a supporter for said damper supported by said housing.

* * * * *